(12) United States Patent
Cho et al.

(10) Patent No.: US 9,769,363 B2
(45) Date of Patent: Sep. 19, 2017

(54) CAMERA MODULE WITH ADHESIVE GROOVE

(71) Applicant: LG Innotek Co., Ltd., Seoul (KR)

(72) Inventors: Jae Hong Cho, Seoul (KR); Hee Se Lee, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/972,658

(22) Filed: Dec. 17, 2015

(65) Prior Publication Data

US 2016/0182775 A1 Jun. 23, 2016

(30) Foreign Application Priority Data

Dec. 17, 2014 (KR) .................. 10-2014-0182667
Dec. 24, 2014 (KR) .................. 10-2014-0188416

(51) Int. Cl.
*H04N 5/225* (2006.01)
*H04N 5/232* (2006.01)

(52) U.S. Cl.
CPC ......... *H04N 5/2252* (2013.01); *H04N 5/2257* (2013.01); *H04N 5/23212* (2013.01)

(58) Field of Classification Search
CPC .................................................. H04N 5/2252
See application file for complete search history.

(56) References Cited

U.S. PATENT DOCUMENTS

| 8,026,978 B2 * | 9/2011 | Osaka | H04N 5/2254 348/335 |
| 9,360,735 B2 * | 6/2016 | Lim | G03B 13/36 |
| 2010/0002317 A1 * | 1/2010 | Osaka | G02B 7/08 359/824 |

* cited by examiner

*Primary Examiner* — Gary C Vieaux
(74) *Attorney, Agent, or Firm* — Saliwanchik, Lloyd & Eisenschenk

(57) ABSTRACT

A camera module is provided, the camera module comprising: a bobbin; a coil arranged at the bobbin; a housing disposed at an inside of the bobbin; a magnet arranged at the housing, to face the bobbin; a rib formed at an inside to be extended from a first lateral wall of the housing to a second lateral wall adjacent to the first lateral wall; and a first adhesive groove formed by a part of a lower surface of the rib being recessed to accommodate an adhesive. The camera module has an advantageous effect in that the magnet may be prevented from being removed from the magnet accommodating portion of the housing, even when external force is applied to the camera module.

20 Claims, 18 Drawing Sheets

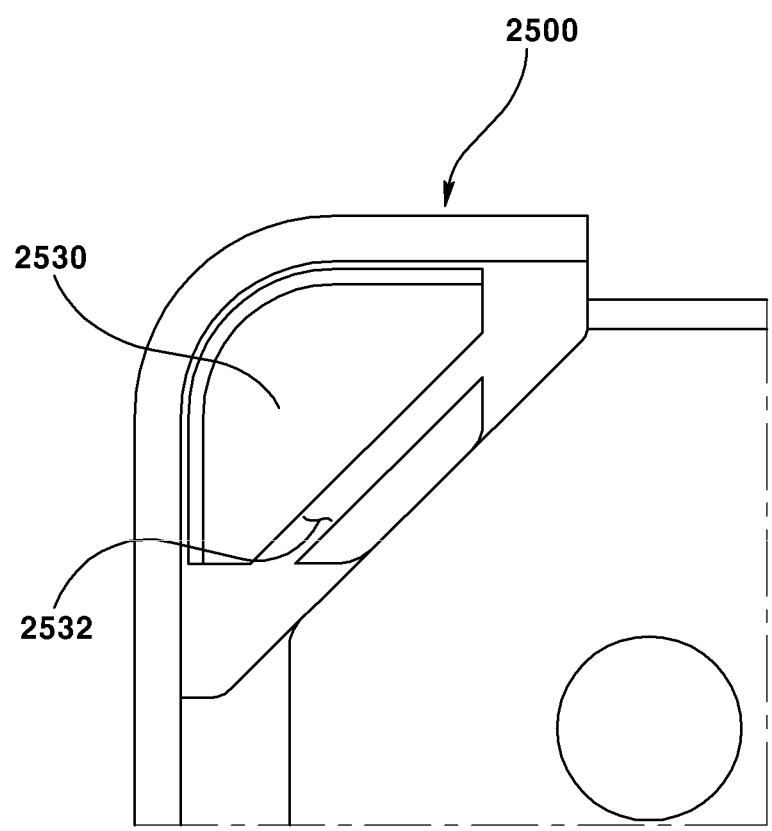

CAMERA MODULE WITH ADHESIVE GROOVE

CROSS-REFERENCE TO RELATED APPLICATIONS

This application claims the benefit under 35 U.S.C. §119 of Korean Application No. 10-2014-0182667 filed Dec. 17, 2014, and of Korean Patent Application No. 10-2014-0188416 filed Dec. 24, 2014, which are hereby incorporated by reference in their entirety.

BACKGROUND

Field of the Invention

The present disclosure relates to a camera module.

Background of the Related Art

The technology described in this section is merely intended to provide background information of an exemplary embodiment of the present disclosure, and does not mean the prior art.

Concomitant with wide propagation of various mobile terminals and commercialization of wireless Internet services, demands by consumers related to the mobile terminals are diversified, and various types of additional equipment are attached to the mobile terminals.

Among the various types of additional equipment, a camera module may be a representative device capable of photographing an object as a still image or a moving picture.

In general, magnet and coil are provided inside of the camera module in order to functions such as AF (Auto Focus) function. When electric power is supplied to the coil, an operator provided with the coil moves to provide such functions as AF function, due to interaction with magnetic force of the magnet.

Meanwhile, the magnet is fixed by being accommodated in a housing, where at least one surface of the housing accommodating the magnet is required to be opened such that electromagnetic force can be generated between the coil and the magnet.

However, the conventional camera module as described in the above has a problem in that the magnet is removed from the housing through the open surface of the housing when external force is applied to the camera module.

BRIEF SUMMARY

In order to solve out the aforementioned problem of the conventional camera module, one purpose of the present disclosure is to provide a camera module where the magnet may be stably accommodated in the housing.

Another purpose of the present disclosure is to provide a camera module capable of preventing removal of the magnet even when the camera is shocked by an external impact such as dropping down.

Still another purpose of the present disclosure is to provide a camera module including a magnet removal prevention portion for preventing the magnet from being removed off when external force is applied to the camera module.

In a general aspect of the present disclosure, there is provided a camera module, the camera module comprising: a bobbin; a coil arranged at the bobbin; a housing disposed at an inside of the bobbin; a magnet arranged at the housing, to face the bobbin; a rib formed at an inside to be extended from a first lateral wall of the housing to a second lateral wall adjacent to the first lateral wall; and a first adhesive groove formed by a part of a lower surface of the rib being recessed to accommodate an adhesive.

In some exemplary embodiments of the present disclosure, the first adhesive groove may diagonally extend from the first lateral wall of the housing to the second lateral wall adjacent to the first lateral wall.

In some exemplary embodiments of the present disclosure, the first adhesive groove may include two circular grooves and a linear groove connecting the two circular grooves.

In some exemplary embodiments of the present disclosure, the camera module may further comprise: a second adhesive groove formed by a part of a lower surface of the rib being recessed to accommodate adhesive, wherein the second adhesive groove may be arranged to be spaced apart from the first adhesive groove, the second adhesive groove being different in shape from the first adhesive groove.

In some exemplary embodiments of the present disclosure, the camera module may further comprise: a complemental adhesive groove formed by a part of a lower surface of the rib being recessed to accommodate an adhesive, wherein the complemental adhesive groove may be arranged to be spaced apart from the first adhesive groove, and at least a part of the complemental adhesive groove may be opened toward an inside of the housing.

In some exemplary embodiments of the present disclosure, the complemental adhesive groove may be provided in plural number to be extended from an inside of the housing to an outside of the housing.

In some exemplary embodiments of the present disclosure, the complemental adhesive groove may include a linear groove arranged in a diagonal direction connecting the first lateral wall of the housing and the second lateral wall adjacent to the first lateral wall of the housing, and an open groove configured to open a part of the linear groove toward an inside of the housing.

In some exemplary embodiments of the present disclosure, the camera module may further comprise: a base configured to support the housing from a lower side; and an OIS (Optical Image Stabilization) coil arranged at the base to face the magnet.

In some exemplary embodiments of the present disclosure, the camera module may further comprise: first and second elastic members configured to elastically support the bobbin with respect to the housing; and an OIS spring configured to elastically support the housing with respect to the base.

In another general aspect of the present disclosure, there is provided a camera module, the camera module comprising: a bobbin; a coil arranged at the bobbin; a housing disposed at an outside of the bobbin; a magnet arranged at the housing to face the bobbin; a magnet accommodating portion arranged at the housing to accommodate at least a part of the magnet; and a base configured to accommodate at an inside at least a part of the housing, wherein at least a part of an outer surface of the housing facing an inner surface of the base may be formed as an inclined surface.

In some exemplary embodiments of the present disclosure, the housing may be accommodated at an upper portion of the base, and the inclined surface may recede farther from an inner surface of the base as the inclined surface extends downward.

In some exemplary embodiments of the present disclosure, the magnet may be fixed at the magnet accommodating portion, where an upper surface of the magnet contacts a contact side surface of the magnet accommodating portion, and a lower surface of the magnet may be opened.

In some exemplary embodiments of the present disclosure, a starting portion of inclination of the inclined surface may become an impact point of external force delivered through the base to the housing.

In some exemplary embodiments of the present disclosure, an outer side surface of the housing may be provided as a first height, and a height of the inclined surface may be higher than or equal to a half of the first height.

In some exemplary embodiments of the present disclosure, at least one surface of the magnet accommodating portion may be provided as an open surface, such that magnetic force of the magnet is applicable to the coil disposed inside, and a catching sill protruded in a center direction of the open surface may be provided at both opposite lateral ends of the open surface.

In some exemplary embodiments of the present disclosure, at least one of the base and the housing may include an air gap for absorbing external force delivered from the base to the housing.

In still another general aspect of the present disclosure, there is provided a camera module, the camera module comprising: a bobbin; a coil arranged at the bobbin; a housing disposed at an outside of the bobbin; a magnet arranged at the housing to face the bobbin; a base configured to support the housing from a lower side; a first lateral wall portion formed at the housing to include an adhesive surface for the magnet to adhere to; a second lateral wall portion formed at the base to accommodate the first lateral wall portion inside of the second lateral wall portion; and an air gap formed on at least one of the first and second lateral wall portions, wherein at least a part of the magnet, the first lateral wall portion, the second lateral wall portion and the air gap may be overlapped with one another.

In some exemplary embodiments of the present disclosure, the air gap may be formed by an air gap formation portion, and the air gap formation portion may be deformed to narrow the air gap and restored by elastic force, when external force is generated from the base to the housing.

In some exemplary embodiments of the present disclosure, a length of the air gap may correspond to a length where the first lateral wall portion is accommodated in the second lateral wall portion.

In some exemplary embodiments of the present disclosure, at least one side of the air gap may be opened.

According to an exemplary embodiment of the present disclosure, the magnet may be stably installed at the housing, because a rib is formed at an inside of an edge of the housing to form a magnet accommodating portion.

In addition, the first adhesive groove accommodating an adhesive as well as the second or complemental adhesive groove may be formed at a lower surface of the rib of the housing, to fill up an adhesive and adhere the magnet on a lower surface of the rib. Thereby, the adhesive strength may be enhanced, and departure of the magnet arranged at the housing may be prevented, even when the camera is shocked by an external impact such as dropping down. Accordingly, the assembly of camera modules may be facilitated and stability of the camera in operation may be enhanced.

In addition, an adhesive may be injected into an opening of the complemental adhesive groove formed on a side surface of the rib, and the amount of the injected adhesive may be ascertained through another opening with the naked eye. Therefore, the adhesive may be prevented from being overflowing in the adhesive groove and flowing in the camera module, and accordingly, defect rate in operation of the camera module may be decreased.

According to an exemplary embodiment of the present disclosure, the magnet may be prevented from being removed from the magnet accommodating portion of the housing even when external force is applied to the camera module.

BRIEF DESCRIPTION OF THE DRAWINGS

FIG. 15 is a plan view illustrating a base of a lens actuator according to a seventh exemplary embodiment of the present disclosure.

DETAILED DESCRIPTION

Figure 1:
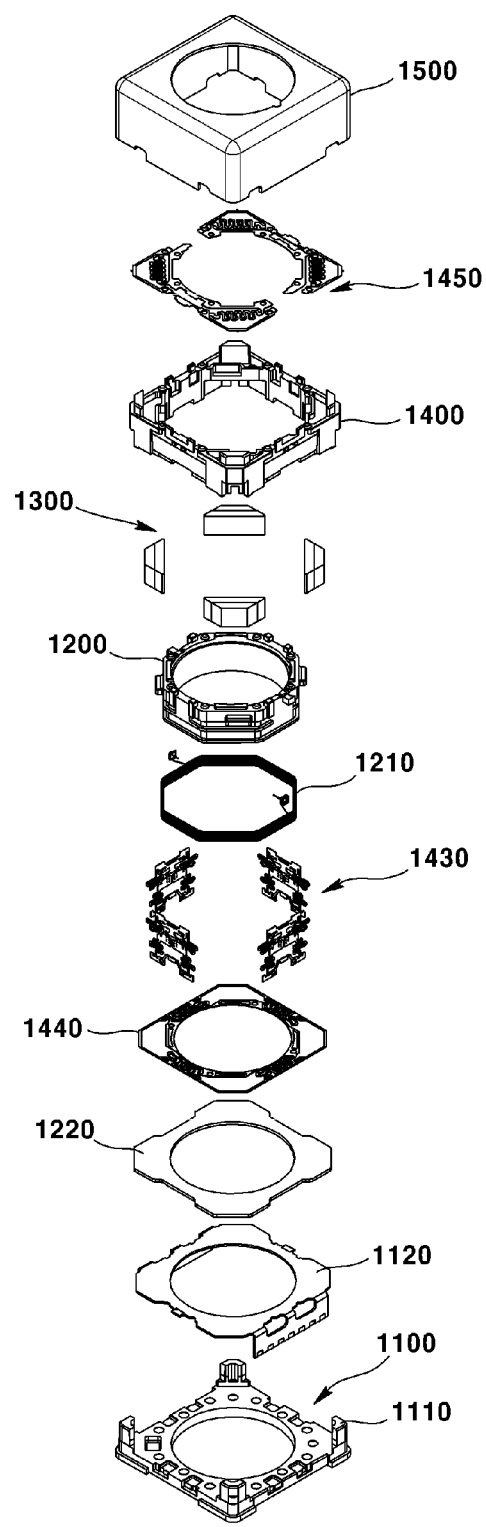
FIG. 1 is an exploded perspective view according to a first exemplary embodiment of the present disclosure.

Hereinafter, exemplary embodiments of the present disclosure will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, when it is determined that a detailed description about known function or structure relating to the present disclosure may disturb understanding of exemplary embodiments of the present disclosure, the detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "optical axis direction" is defined as a direction of an optical axis of a lens module installed at a lens actuator. Meanwhile, the term "optical axis direction" may be used in combination with the terms such as "up/down direction", "z-axis direction", etc.

As used herein, the term "auto focus function" is defined as a function to focus on the subject by moving the lens module in the optical axis direction according to distance to the subject to adjust the distance between an image sensor and the subject, in order to form a clear image on the image sensor. Meanwhile, the term "auto focus" may be used in combination with the term "AF (Auto Focus)".

As used herein, the term "handshake compensation function" is defined as a function to move or tilt the camera module in a direction perpendicular to the optical axis direction so as to counterbalance trembling (motion) generated by the image sensor due to external force. Meanwhile, the term "handshake compensation" may be used in combination with the term "OIS (Optical Image Stabilization)".

Hereinafter, a structure of an optical apparatus according to an exemplary embodiment of the present disclosure will be described.

An optical apparatus according to an exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to an exemplary embodiment of the present disclosure may include a main body (not illustrated), a display unit (not illustrated) configured to display information by being arranged at a surface of the main body, and a camera (not illustrated) including a camera module (not illustrated) configured to photograph a picture or motion picture by being installed at the main body.

Hereinafter, a structure of a camera module according to an exemplary embodiment of the present disclosure will be described.

The camera module may further include a lens actuator (not illustrated), a lens module (not illustrated), an infrared cut-off filter (not illustrated), a printed circuit board (not illustrated), an image sensor (not illustrated) and a controller (not illustrated).

The lens module may include at least one lens (not illustrated) and a lens barrel accommodating at least one lens. However, a structure of the lens module is not limited to the lens barrel. Thus, any holder structure which is able to support a lens may be employed. The lens module may move along with the lens actuator by being coupled to the lens actuator. As an example, the lens module may be screw-coupled to the lens actuator. As an example, the lens module may be coupled with the lens actuator via an adhesive (not illustrated). Meanwhile, the light that has passed through the lens module may be irradiated to the image sensor.

The infrared cut-off filter may block light in an infrared area from being incident on the image sensor. As an example, the infrared cut-off filter may be disposed between the lens module and the image sensor. The infrared cut-off filter may be installed at a holder member (not illustrated) provided independently of a base (500). The infrared cut-off filter may be installed at a penetration hole (510) formed on a center portion of the base (500). As an example, the infrared cut-off filter may be formed of a film material or a glass material. Meanwhile, as an example, the infrared cut-off filter may be formed by a process where a kind of infrared cut-off coating material is coated on a flat optical filter such as a cover glass for image plane protection.

The printed circuit board may support the lens actuator. An image sensor may be mounted at the printed circuit board. As an example, the image sensor may be disposed at an inside of an upper surface of the printed circuit board, and a sensor holder (not illustrated) may be disposed at an outside of an upper surface of the printed circuit board. Alternatively, the image sensor may be disposed at an inside of an upper surface of the printed circuit board, and the lens actuator may be disposed at an outside of an upper surface of the printed circuit board. Through such structure, the light that has passed through the lens module accommodated inside of the lens actuator may be irradiated to the image sensor mounted at the printed circuit board. Meanwhile, a controller configured to control the lens actuator may be disposed at the printed circuit board.

The image sensor may be mounted on the printed circuit board. The image sensor may be disposed to have the same optical axis with that of the lens module. Through such structure, the image sensor may obtain the light that has passed through the lens module. The image sensor may output the irradiated light as a picture. As an example, the image sensor may be any one of a CCD (charge coupled device), an MOS (metal oxide semi-conductor), a CPD (charge priming device) and a CID (charge injection device), but not limited hereto.

The controller may be mounted at the printed circuit board. The controller may be disposed outside of the lens actuator. Alternatively, the controller may be disposed inside of the lens actuator. The controller may be disposed at an outside of the lens actuator. Alternatively, the controller may be disposed at an inside of the lens actuator. The controller may control direction, intensity and amplitude of current supplied to each of components composing the lens actuator. The lens may perform at least one of auto focus function and handshake compensation function by controlling the lens actuator. That is, the controller may control the lens actuator to move the lens module in an optical axis direction or in a direction perpendicular to the optical axis direction, or may tilt the lens module. Furthermore, the controller may perform feedback control of the auto focus and handshake compensation functions. More particularly, the controller may control electric power or current applied to first through third operation units by receiving a position of a bobbin or housing detected by a sensor.

Hereinafter, a structure of a lens actuator according to first through fifth exemplary embodiments of the present disclosure will be described, with reference to the drawings.

Figure 2:
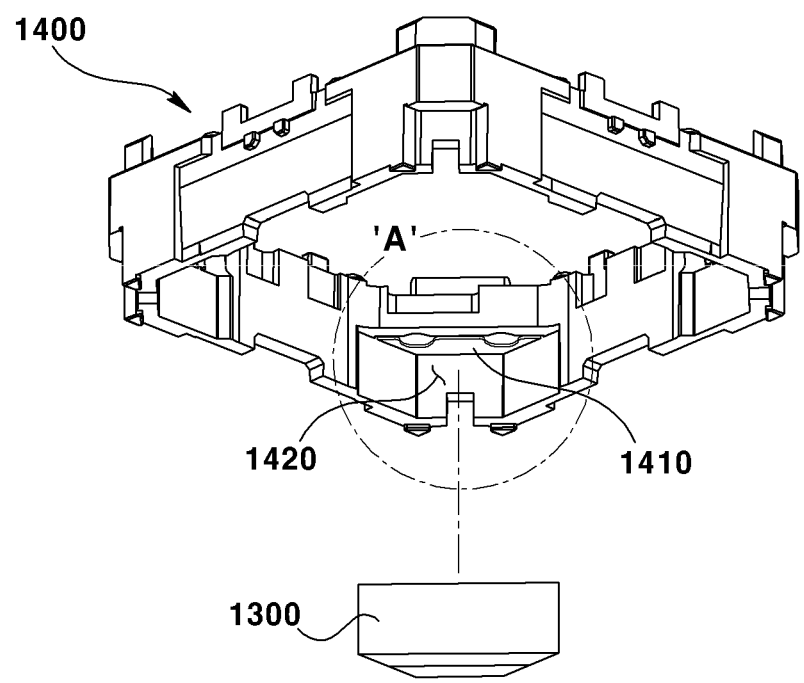
FIG. 2 is a bottom perspective view illustrating a second adhesive groove formed by showing an arrangement of magnet and housing according to a first exemplary embodiment of the present disclosure.
Figure 3A:
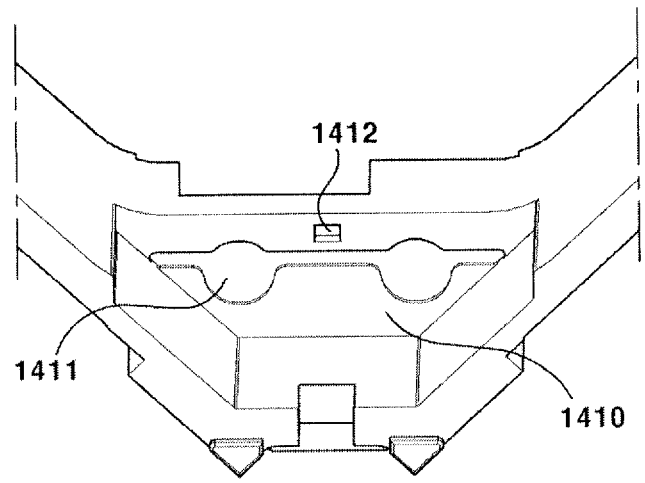
FIGS. 3(a) and 3(b) are bottom perspective views illustrating first and second adhesive grooves formed on a rib according to a first exemplary embodiment of the present disclosure.
Figure 3B:
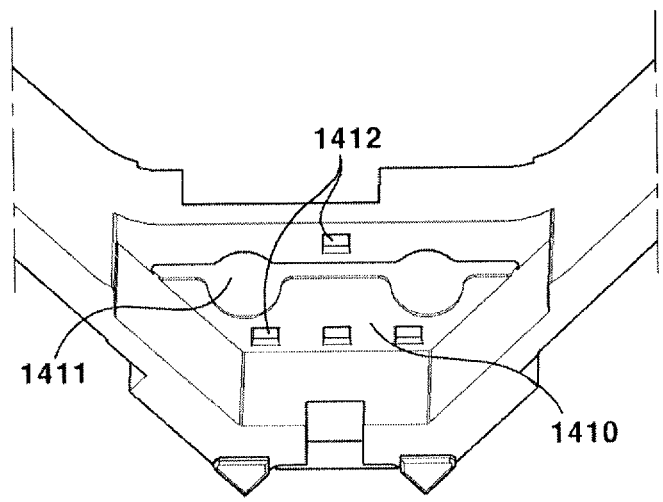
Figure 4A:
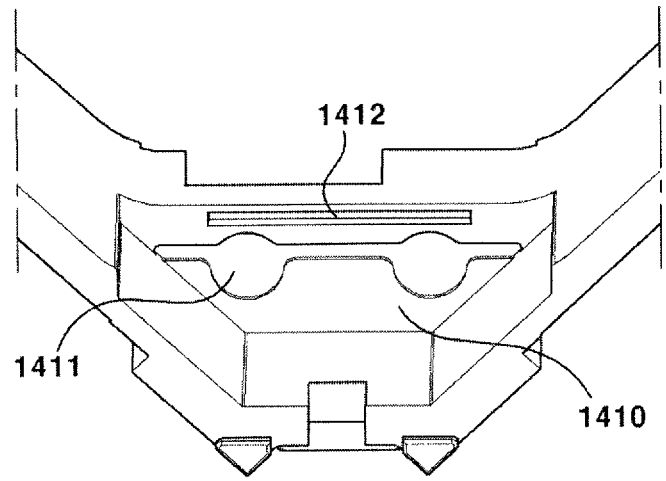
FIGS. 4(a) and 4(b) are bottom perspective views illustrating a first adhesive groove and a second adhesive groove in shape of a channel formed on a rib according to a second exemplary embodiment of the present disclosure.
Figure 4B:
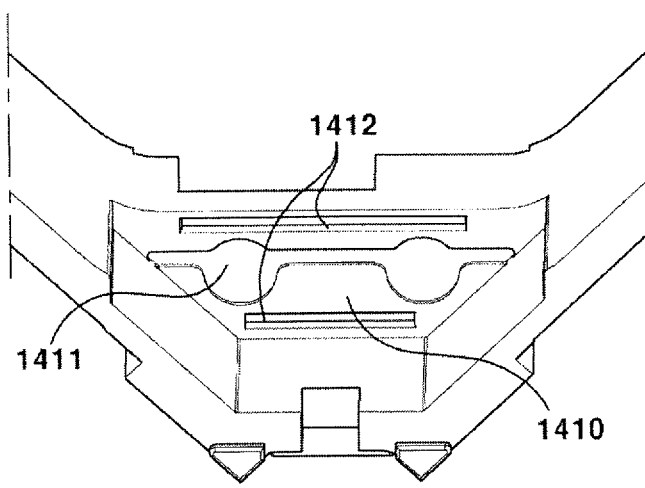
Figure 5A:
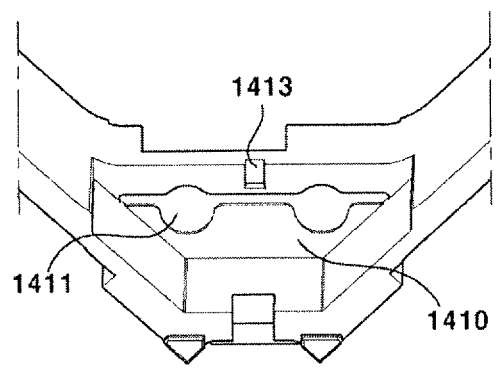
FIGS. 5(a) through 5(h) are bottom perspective views illustrating a first adhesive groove and a complemental adhesive groove open to a bobbin that are formed on a rib according to a third exemplary embodiment of the present disclosure.
Figure 5B:
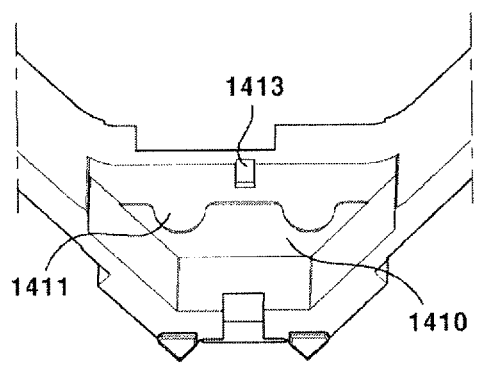
Figure 5C:
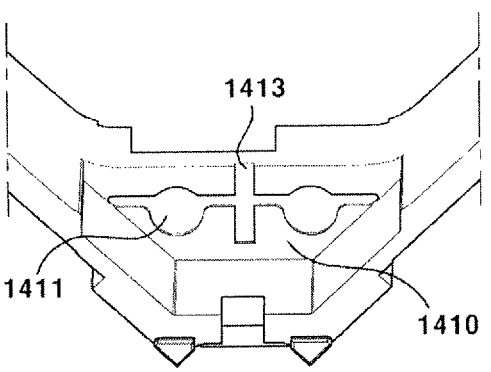
Figure 5D:
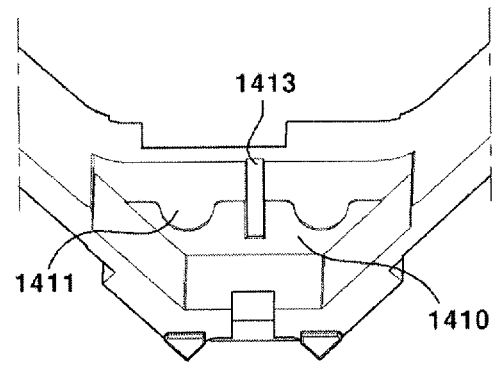
Figure 5E:
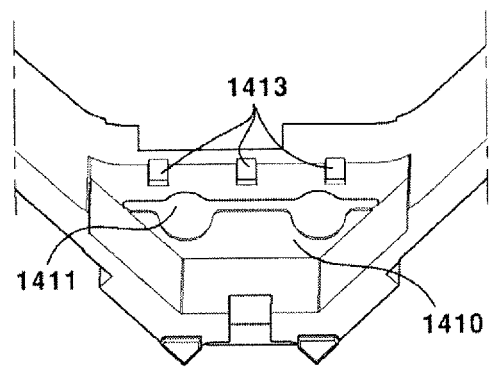
Figure 5F:
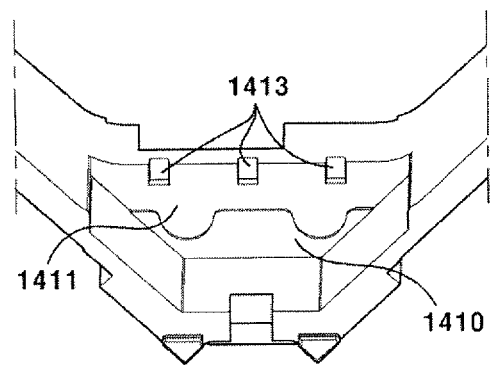
Figure 5G:
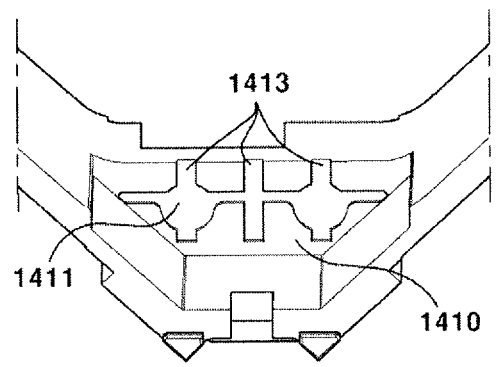
Figure 5H:
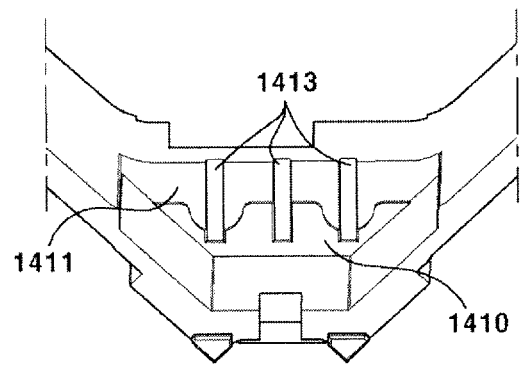
Figure 6A:
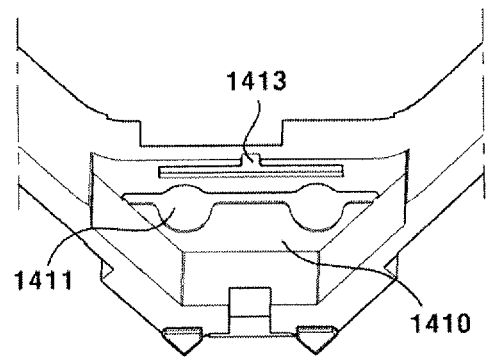
FIGS. 6(a) through 6(f) are bottom perspective views illustrating a first adhesive groove and a complemental adhesive groove in shape of a channel open to a bobbin that are formed on a rib according to a fourth exemplary embodiment of the present disclosure.
Figure 6B:
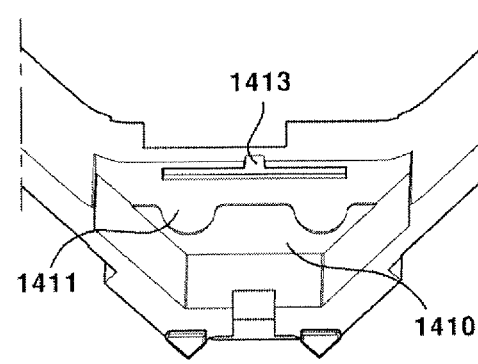
Figure 6C:
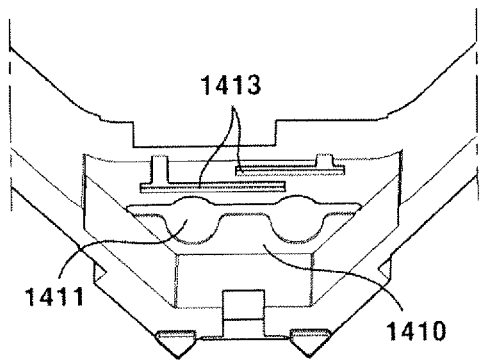
Figure 6D:
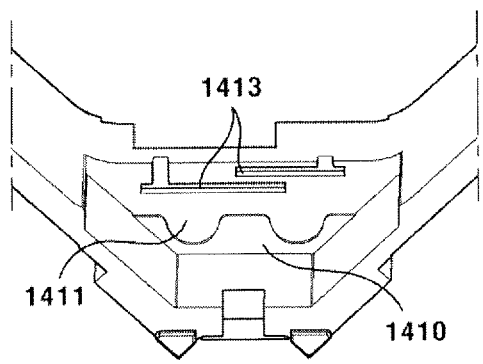
Figure 6E:
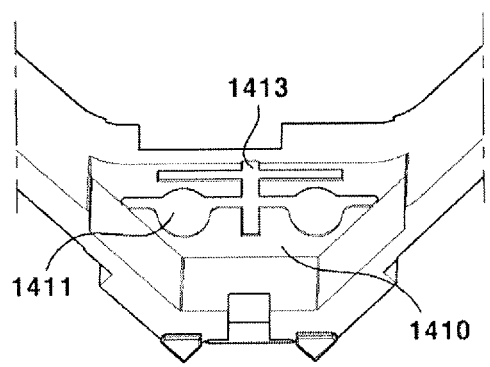
Figure 6F:
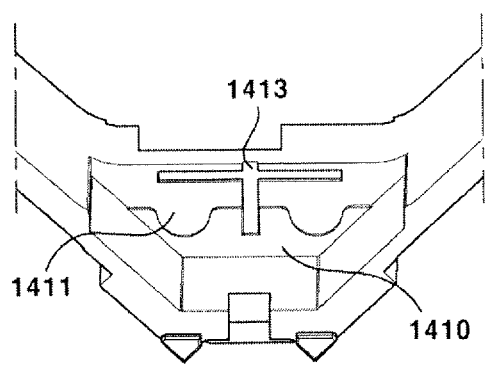

FIG. 1 is an exploded perspective view according to a first exemplary embodiment of the present disclosure; FIG. 2 is a bottom perspective view illustrating a second adhesive groove formed by showing an arrangement of magnet and housing according to a first exemplary embodiment of the present disclosure; FIGS. 3(a) and 3(b) are bottom perspective views illustrating first and second adhesive grooves formed on a rib according to a first exemplary embodiment of the present disclosure; FIGS. 4(a) and 4(b) are bottom perspective views illustrating a first adhesive groove and a second adhesive groove in shape of a channel formed on a rib according to a second exemplary embodiment of the present disclosure; FIGS. 5(a) through 5(h) are bottom perspective views illustrating a first adhesive groove and a complemental adhesive groove open to a bobbin that are formed on a rib according to a third exemplary embodiment of the present disclosure; FIGS. 6(a) through 6(f) are bottom perspective views illustrating a first adhesive groove and a complemental adhesive groove in shape of a channel open to a bobbin that are formed on a rib according to a fourth exemplary embodiment of the present disclosure; FIGS. 7(a) through 7(f) are bottom perspective views illustrating a first adhesive groove and a complemental adhesive groove of which channel is open to a bobbin that are formed on a rib according to a fifth exemplary embodiment of the present disclosure; and FIG. 8 is a bottom perspective view illustrating a rib of FIGS. 5(a) through 7(f) coupled with a magnet.

Referring to FIG. 1, the lens actuator according to first through fifth exemplary embodiments of the present disclosure may include a base (1100), a bobbin (1200) wound by an AF (Auto Focus) coil (1210), a magnet (1300), and a housing (1400).

The bobbin (1200) may be formed in shape of a pillar of which top and bottom are opened. A center hole in shape of a cylinder is formed in the bobbin (1200). The center hole formed in the bobbin (1200) may accommodate a lens module (not illustrated) formed of at least one lens for light to penetrate.

The AF coil (1210) may be wound at an outside of the bobbin (1200).

The magnet (1300) may be provided in plural number to face the AF coil (1210) wound at an outside of the bobbin (1200). Gaps between two adjacent magnets (1300) may be arranged at a same interval. When current flows in the AF coil (1210), an electromagnetic filed is formed at the AF coil (1210), and the magnet (1300) may electromagnetically interact with the AF coil (1210) to move the bobbin (1200) upward and downward.

The housing (1400) may cover the bobbin (1200) at an outside of the bobbin (1200). A center hole may be formed in the housing (1400), where upper and lower portions of the housing (1400) are opened. The housing (1400) may include a magnet accommodating portion (1420) provided at an inside of an edge thereof to accommodate the magnet (1300).

A first elastic member (1440) may be formed in shape of a leaf spring to be arranged at a lower portion of the housing (1400). A hole for the light to penetrate through the lens module may be formed on the first elastic member (1440). An upper surface of the first elastic member (1440) around the hole may contact a lower portion of the bobbin (1200), to elastically support the bobbin (1200) from the housing (1400).

An OIS (Optical Image Stabilization) coil (1220) may be arranged at a lower portion of the first elastic member (1440). The OIS coil (1220) may be formed as a plate body, including a hole formed therein for the light to penetrate through the lens module. The first elastic member (1440) may be arranged between the OIS coil (1220) and the housing (1400). The OIS coil (1220) may face a lower surface of the magnet (1300) accommodated in the housing (1400), having a penetration hole formed on the first elastic member (1440) intervened therebetween. The OIS coil (1220) may perform a function to compensate handshaking of a user, by moving the bobbin (1200) installed with the lens module and the housing (1400) in a horizontal direction with respect to the image sensor (to be described hereinafter). That is, when electrical current flows in the OIS coil (1220), an electromagnetic field may be formed at the OIS coil (1220), to move the housing (1400) and the bobbin (1200) accommodated in the housing (1400) in a horizontal direction, by interacting with the magnet (1300).

The OIS spring (1430) may be arranged at a lateral surface of the housing (1400). The OIS spring (1430) may elastically support the housing (1400) with respect to the base (1100) (to be described hereinafter). The OIS spring (1430) may perform a function to return the bobbin (1200) and the housing (1400), which have moved in a horizontal direction with respect to the image sensor (to be described hereinafter), to the original position.

The wiring board (1120) may be arranged at a lower portion of the OIS coil (1220). The wiring board (1120) may include a hole for light to penetrate through the lens module. The wiring board (1120) may be formed as a FPCB (Flexible Printed Circuit Board). The wiring board (1120) may deliver the supplied current through a terminal formed at a side thereof to the OIS coil (1220) or OIS spring (1430). The current delivered to the OIS spring (1430) may be supplied through the second elastic member (1450) to the AF coil (1210). Thereby, an electromagnetic field may be formed at the AF coil (1210) or OIS coil (1220).

A pillar (1110) may be formed at each edge of the base (1100). The housing (1400) may be arranged at an internal side of the pillar (1110). The base (1100) may support the housing (1400) through the first elastic member (1440), such that the housing (1400) becomes movable. Since the housing (1400) supported by the base (1100) is spaced apart from the pillar (1100), the housing (1400) may move in a horizontal direction within the spaced distance. A hole for the light that has penetrated through the lens module to penetrate through may be formed at the base (1100). The OIS coil (1220), first elastic member (1440) and wiring board (1220) may be arranged between the base (1100) and the housing (1400).

Although not illustrated in the drawings, a printed circuit board may be arranged at a lower side of the base (1100). An image sensor configured to convert the light that has penetrated through the lens module into an electrical signal may be mounted around an upper center of the printed circuit board. Components for operation of the image sensor may be arranged at the printed circuit board, or a plurality of terminals configured to supply electric power and to output information of the image sensor may be provided at the printed circuit board. In addition, an infrared cut-off filter configured to filter an infrared ray before the light that has penetrated through the lens module arrives at the image sensor may be installed at the base (1100).

The second elastic member (1450) may be formed in shape of a leaf spring arranged at an upper side of the housing (1400). The second elastic member (1450) may include a hole for the light to penetrate through the lens module. A lower surface formed with the spring around the hole of the second elastic member (1450) may contact an upper side of the bobbin (1200) to elastically support the bobbin (1200) with respect to the housing (1400).

Since the first and second elastic members (1440, 1450) elastically support the bobbin (1200) that is moved up/downward by the magnet (1300), the first and second elastic members (1440, 1450) may return the bobbin (1200) to its original position.

The cover can (1500) may cover the foregoing components. The cover can (1500) may include a hole such that the light can penetrate through the lens module.

FIG. 2 illustrates arrangement of the magnet (1300) and the housing (1400). Referring to FIG. 2, the housing (1400) may be formed as a prism including a center hole, where upper and lower portions of the housing (1400) are opened. The housing (1400) may accommodate the bobbin (1200) in the inner center hole such that the bobbin (1200) can move up/downward. The housing (1400) may include a rib (1410) in shape of a plate diagonally extend from a side to another adjacent side at an inside of an edge thereof.

Referring FIGS. 2 through 8, a rib (1410) may be formed at upper and lower sides of the housing (1400), or between the upper and lower sides of the housing (1400). The rib (1410) may allow a magnet accommodating portion (1420) for accommodating a magnet (1300) to be formed at an inner side of an edge of the housing (1400). Although an exemplary embodiment where the rib (1410) is formed between upper and lower sides of the housing (1400) to form the magnet accommodating portion (1420) at a lower space of the rib (1410) is to be described herein, the present disclosure is not limited hereto. When the magnet accommodating portion (1420) is formed at a lower side of the rib (1410) and a magnet (1300) is accommodated in the magnet accommodating portion (1420), a lower surface of the rib (1410) contacts an upper surface of the magnet (1300) such that the rib (1410) may support the magnet (1300). In a case where the lens actuator is shocked by external force such as dropping down, the magnet (1300) may be departed from the magnet accommodating portion (1420). Therefore, an adhesive may be coated on an upper surface of the magnet (1300) and on a lower surface of the rib (1410), in order to the departure of the magnet (1300).

However, the departure of the magnet (1300) from the magnet accommodating portion (1420) may hardly be prevented when the adhesive (1414) is just partially coated. Therefore, the lens actuator according to an exemplary embodiment of the present disclosure may include an adhesive groove, in order to solve out such problem.

Referring to FIGS. 3(*a*) through 8, a first adhesive groove (1411) may be formed at a lower surface of the rib (1410), in order to reinforce adhesion between the magnet (1300) and the rib (1410). When an adhesive is coated on a lower surface of the rib (1410) directly contacting the magnet (1300), the magnet (1300) is adhered to the rib (1410) by the adhesive, and the overflowed adhesive may be accommodated in the first adhesive groove (1411). Meanwhile, the adhesive may be coated directly in the first adhesive groove (1411) to adhere an upper surface of the magnet (1300) and a lower surface of the rib (1410). In addition, the first adhesive groove (1411) may be formed in shape of a straight line, although it is illustrated that parts of the first adhesive groove (1411) are extended in a width direction for the adhesive overflowed when the magnet (1300) is adhered to the rib (1410) by the adhesive to be accommodated.

Referring to FIGS. 3(*a*) and 3(*b*), the lens actuator according to a first exemplary embodiment of the present disclosure may include at least one second adhesive groove (1412) at a lower surface of the rib (1410), as well as the first adhesive groove (1411). Like the first adhesive groove (1411), the second adhesive groove (1412) may reinforce adhesion between an upper surface the magnet (1300) and a lower surface of the rib (1410), by accommodating the adhesive (1414) to bond the upper surface the magnet (1300) with the lower surface of the rib (1410). The second adhesive groove (1412) may be formed at both sides with the first adhesive groove (1411) as a center.

Referring to FIGS. 4(*a*) and 4(*b*), the lens actuator according to a second exemplary embodiment of the present disclosure may include at least one second adhesive groove (1412) in shape of a channel at a lower surface of the rib (1410), as well as the first adhesive groove (1411). The second adhesive groove (1412) may be formed at both sides centered with the first adhesive groove (1411). In addition, although it is not illustrated in the drawings, the channel shape of the second adhesive groove (1412) may form a curve. The shape of the second adhesive groove (1412) is not limited to any particular shape.

Referring to FIGS. 5(*a*) through 5(*h*) and FIG. 8, the lens actuator according to a third exemplary embodiment of the present disclosure may include at least one complemental adhesive groove (1413) at a lower surface of the rib (1410), as well as the first adhesive groove (1411). One end of the complemental adhesive groove (1413) may be opened at a later surface of the rib (1410) toward the bobbin (1200). Alternatively, the complemental adhesive groove (1413) may be formed traversing the first adhesive groove (1411). After the magnet (1300) is adhered to the rib (1410) by an adhesive (1414) injected in the first adhesive groove (1411), the adhesive (1411) may be additionally injected in an opening of the complemental adhesive groove (1413) to reinforce adhesion between the rib (1410) and the magnet (1300).

Meanwhile, as illustrated in FIGS. 5(*b*), 5(*d*), 5(*f*) and 5(*h*), the first adhesive groove (1411) may concavely form a step at a lower surface of the rib (1410), and a complemental adhesive groove (1413) may be formed at the first adhesive groove (1411). In a case where the first adhesive groove (1411) is not fully filled with the adhesive while the upper surface of the magnet (1300) is adhered to the lower surface of the rib (1410), the adhesive (1414) may be additionally injected through an opening of the complemental adhesive groove (1413), thereby the adhesive (1414) may overflow to fill empty space in the first adhesive groove (1411).

Referring to FIGS. 6(*a*) through 6(*f*) and FIG. 8, the lens actuator according to a fourth exemplary embodiment of the present disclosure may include at least one complemental adhesive groove (1413) at a lower surface of the rib (1410), as well as the first adhesive groove (1411). The at least one complemental adhesive groove (1413) may be formed in shape of a channel, such that one side of each channel may be opened at a lateral surface of the rib (1410). After the magnet (1300) is adhered to the rib (1410) by an adhesive (1414) injected in the first adhesive groove (1411), the adhesive (1411) may be additionally injected in an opening of the complemental adhesive groove (1413) to reinforce adhesion between the rib (1410) and the magnet (1300).

Meanwhile, as illustrated in FIGS. 6(*b*), 6(*d*) and 6(*f*), the first adhesive groove (1411) may concavely form a step at a lower surface of the rib (1410), and a complemental adhesive groove (1413) may be formed at the first adhesive groove (1411). In a case where the first adhesive groove (1411) is not fully filled with the adhesive while the upper surface of the magnet (1300) is adhered to the lower surface of the rib (1410), the adhesive (1414) may be additionally injected through an opening of the complemental adhesive groove (1413), thereby the adhesive (1414) may overflow to fill empty space in the first adhesive groove (1411).

Figure 7A:
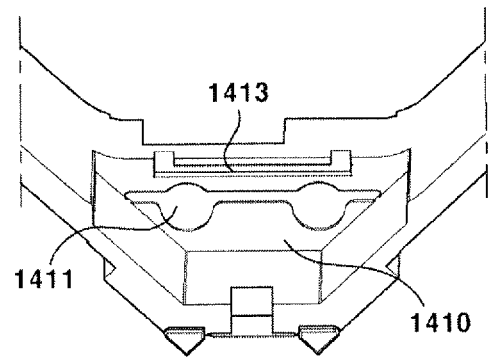
FIGS. 7(a) through 7(f) are bottom perspective views illustrating a first adhesive groove and a complemental adhesive groove of which channel is open to a bobbin that are formed on a rib according to a fifth exemplary embodiment of the present disclosure.
Figure 7B:
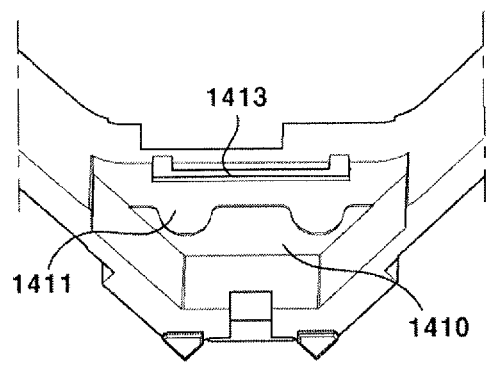
Figure 7C:
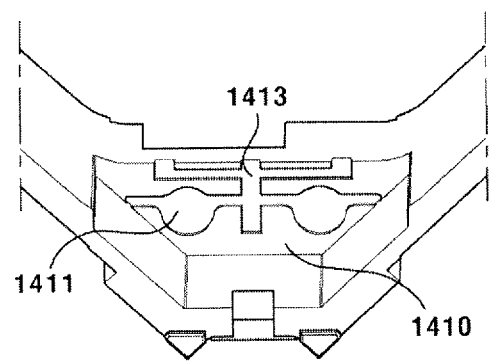
Figure 7D:
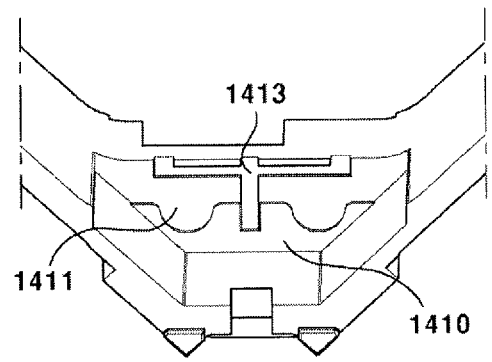
Figure 7E:
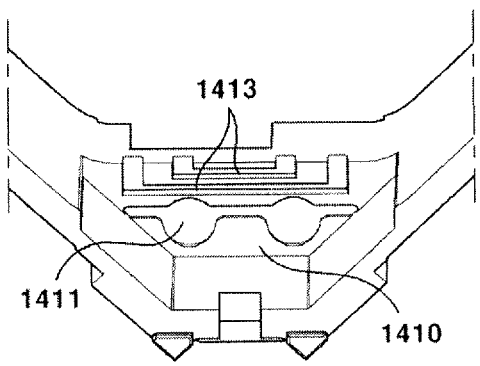
Figure 7F:
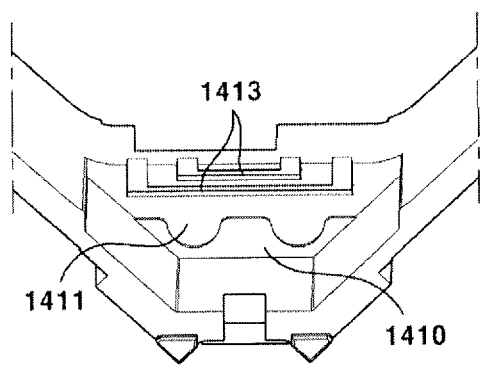
Figure 8:
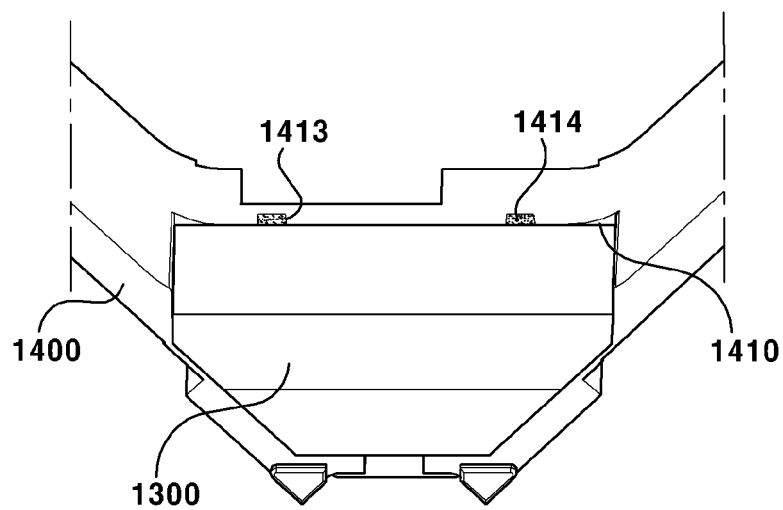
FIG. 8 is a bottom perspective view illustrating a rib of FIGS. 5(a) through 7(f) coupled with a magnet.

Referring to FIGS. 7(a) through 7(f) and FIG. 8, the lens actuator according to a fifth exemplary embodiment of the present disclosure may include at least one complemental adhesive groove (1413) at a lower surface of the rib (1410), as well as the first adhesive groove (1411). The at least one complemental adhesive groove (1413) may be formed in shape of a channel, such that both opposite ends of each channel may be all opened at a lateral surface of the rib (1410). In addition, as illustrated in FIG. 7(b), the channel-shaped complemental adhesive groove (1413) may be opened at a lateral surface of the rib (1410), where the opening of the complemental adhesive groove (1413) is formed in plural number.

After the magnet (1300) is adhered to the rib (1410) by an adhesive (1414) injected in the first adhesive groove (1411), the adhesive (1411) may be additionally injected in an opening of the complemental adhesive groove (1413) to reinforce adhesion between the rib (1410) and the magnet (1300). In addition, when an adhesive (1414) is injected in an opening of the complemental adhesive groove (1413), the adhesive (1414) is visibly ascertainable with the naked eye through another opening, while the channel is being filled with the adhesive (1414). Therefore, the person who injects the adhesive (1414) can measure the amount of the adhesive (1414) being injected.

Meanwhile, as illustrated in FIGS. 7(b), 7(d) and 7(f), the first adhesive groove (1411) may concavely form a step at a lower surface of the rib (1410), and a complemental adhesive groove (1413) may be formed at the first adhesive groove (1411). In a case where the first adhesive groove (1411) is not fully filled with the adhesive while the upper surface of the magnet (1300) is adhered to the lower surface of the rib (1410), the adhesive (1414) may be additionally injected through an opening of the complemental adhesive groove (1413), thereby the adhesive (1414) may overflow to fill empty space in the first adhesive groove (1411).

Hereinafter, a structure according to sixth and seventh exemplary embodiments of the present disclosure will be described, with reference to the drawings.

Figure 9:
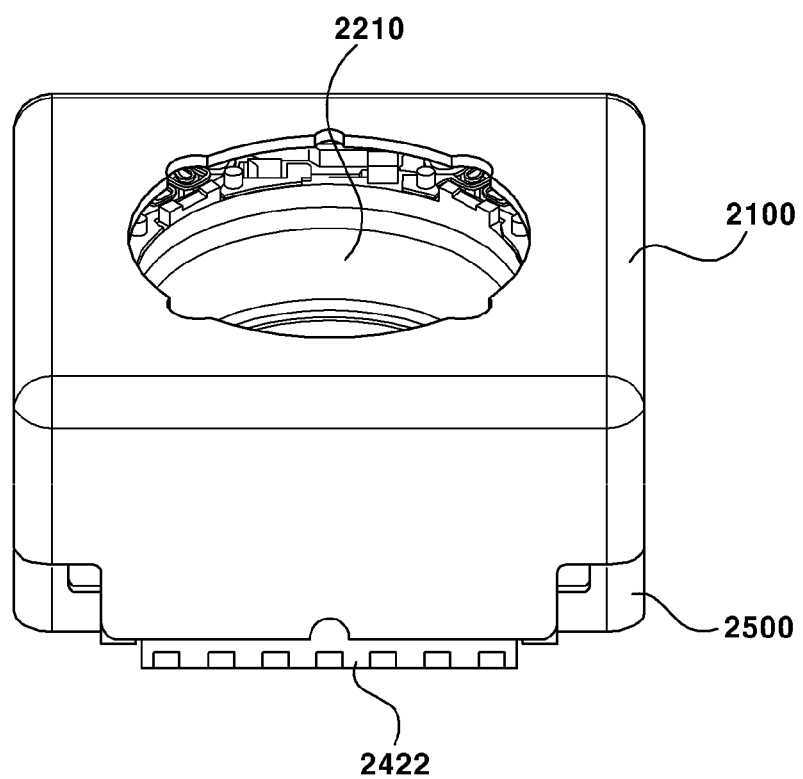
FIG. 9 is a perspective view illustrating a lens actuator according to a sixth exemplary embodiment of the present disclosure.
Figure 10:
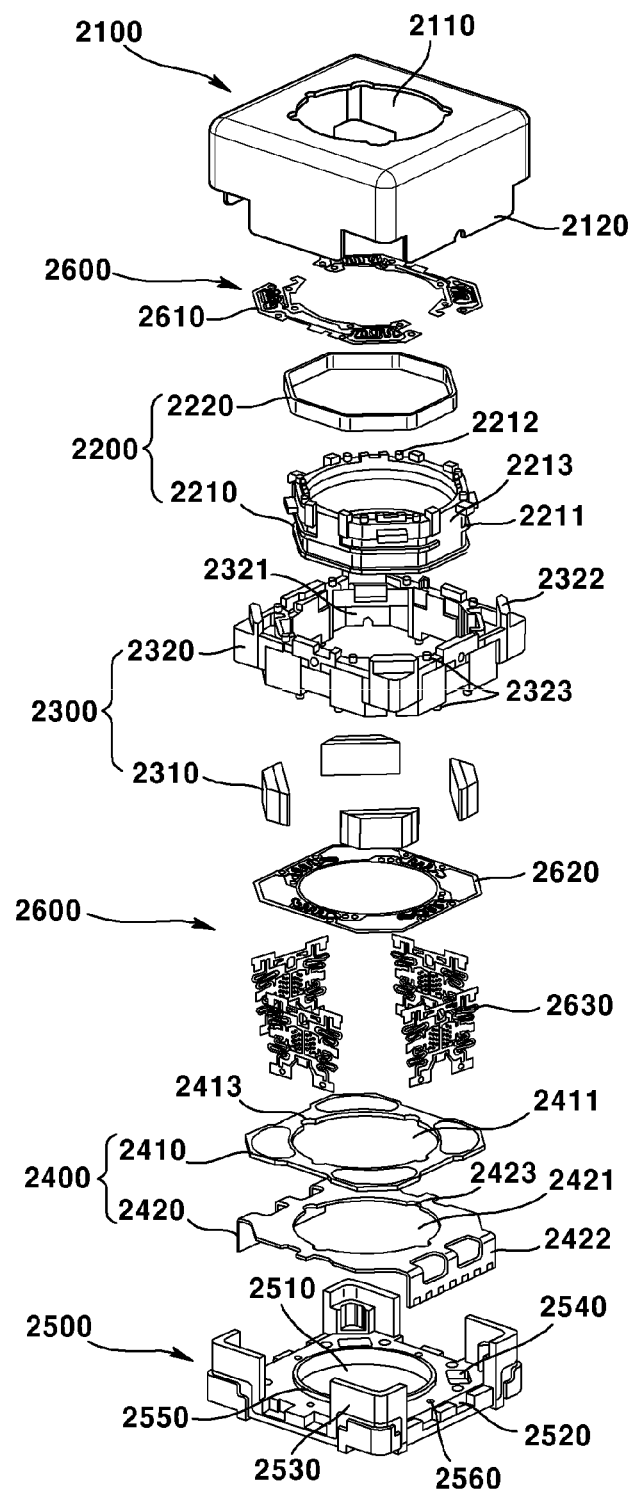
FIG. 10 is an exploded perspective view of a lens actuator according to a sixth exemplary embodiment of the present disclosure.

FIG. 9 is a perspective view illustrating a lens actuator according to a sixth exemplary embodiment of the present disclosure, and FIG. 10 is an exploded perspective view of a lens actuator according to a sixth exemplary embodiment of the present disclosure.

Referring to FIGS. 9 and 10, the lens actuator according to sixth and seventh exemplary embodiments of the present disclosure may include a cover can (2100), a first operator (2200), a second operator (2300), a base (2500) and an elastic unit (2600).

The cover can (2100) may accommodate the first operator (2200), stator (2400) and second operator (2300). The cover can (2100) may be mounted on the base (2500) to form an external appearance of the camera module. In particular, the cover can (2100) may be mounted on the base (2500), where an inner lateral surface of the cover can (2100) is adhered to a part or whole of a lateral surface of the base (2500). The cover can (2100) may function to protect internal components from external impact, as well as to prevent intrusion of external contaminants.

In addition, the cover can (2100) may also function to protect components of the camera module from external electronic interference generated by devices such as mobile phones. Therefore, the cover can (2100) may be formed of metallic material.

The cover can (2100) may be implemented as a yoke portion itself. Alternatively, the cover can (2100) may include a yoke portion fixed by a molding process at an inner side thereof. According to an exemplary embodiment of the present disclosure, an opening (2110) to expose a lens unit (not illustrated) may be formed on an upper surface of the cover can (2100). An inner yoke (not illustrated) formed by being bent inward of the cover can (2100) may be formed at a lower portion of an upper lateral surface of the cover can (2100). The inner yoke may be disposed at an introduction portion (2213) formed at the bobbin (2210).

In such case, the inner yoke may be arranged at an edge around an upper lateral surface opening of the yoke portion, or at a lateral surface of thereof, and the introduction portion (2213) of the bobbin (2210) may be formed at a position corresponding thereto.

In addition, the cover can (2100) may include at least one coupling piece (2120) formed being extended on each surface of lower portion of the cover can (2100). A coupling groove (2520) in which the coupling piece (2120) is to be inserted may be formed on the base (2500). The camera module may be more strongly coupled and sealed through such structure.

Meanwhile, the first operator (2200) may be arranged at a lateral surface of the lens unit, in order to move the lens unit. The first operator (2200) may include a bobbin (2210) to fix the lens unit, and a first coil portion (2220) provided at an outer circumferential surface of the bobbin (2210).

The lens unit may include a lens barrel provided with at least one lens (not illustrated), but not limited hereto. Thus, any holder structure which is able to support a lens may be included.

An inner circumferential surface of the bobbin (2210) may fix the lens unit, by being coupled to an outer circumferential surface of the lens unit. In addition, a guide portion (2211) to guide a first coil portion (2220) to be wound or installed may be formed on an outer circumferential surface of the bobbin (2210). The guide portion (2211) may be integrally formed with an outer lateral surface of the bobbin (2210), and may be continuously formed or formed by being spaced apart at a predetermined interval along an outer lateral surface of the bobbin (2210).

In addition, a spring coupling protrusion (2212) may be formed at upper and lower lateral surfaces of the bobbin (2210), where upper spring (2610) or lower spring (2620) to support the bobbin (2210) with respect to upper or lower portion of the housing (2320) is coupled to the spring coupling protrusion (2212).

In addition, the bobbin (2210) may include an introduction portion (2213) formed on an outer circumferential surface thereof, such that an inner yoke (to be described hereinafter) of the cover can (2100) can be disposed between the bobbin (2210) and the first coil portion (2220) wound on the bobbin (2210).

In addition, the first coil portion (2220) may be wound on an outer circumferential surface of the bobbin (2210), by being guided by the guide portion (2211). Alternatively, four separate coils may be arranged on an outer lateral surface of the bobbin (2210) at a 90 degree interval. The firsts coil portion (2220) may receive electric power applied from a printed circuit board (not illustrated) to form an electromagnetic field.

Meanwhile, the second operator (2300) may be disposed at a lateral surface of the first operator (2200) to face the first operator (2200). The second operator (2300) may include a magnet (2310) disposed to face the first coil portion (2220), and a housing (2320) to which the magnet (2310) is fixed.

In particular, the magnet (2310) may be fixed to the housing (2320) using materials such as an adhesive, such that the magnet (2310) can be disposed at a position facing an outer lateral surface of the first coil portion (2220). The magnet (2130) may be arranged at four edges of the housing (2320) at a same interval, aiming to efficient use of internal volume.

The housing (2320) may be formed in shape corresponding to an inner lateral surface of the cover can (2100) forming an external appearance of the camera module. In addition, the housing (2320) may be formed of an insulated material, and may be implemented as an injection molding material, in consideration of productivity. The housing (2320) may be arranged to be spaced apart at a predetermined distance from the cover can (2100), as a movable component for OIS (Optical Image Stabilization) operation.

According to an exemplary embodiment of the present disclosure, the housing (2320) may be formed to correspond to a shape of the cover can (2100) and may be provided by being spaced apart from the cover can (2100) at a predetermined distance, where upper and lower sides of the housing opened to accommodate the first operator (2200) movable up/downward. In addition, the housing (2320) may include at a lateral surface thereof a magnet accommodating portion (2321) formed in a shape corresponding to that of the magnet (2310) to accommodate the magnet (2310).

In addition, at least two stoppers (2322) may be formed at an upper lateral surface of the housing (2320), where the at least two stoppers (2322) may be protrusively formed at a predetermined interval to absorb impacts by contacting an upper lateral surface of the cover can (2100) when an external shock occurs. The stopper (2322) may be integrally formed with the housing (2320).

In addition, a spring coupling protrusion (2323) may be formed at upper and lower lateral surfaces of the housing (2320), where upper spring (2610) or lower spring (2620) to support the bobbin (2210) is coupled to the spring coupling protrusion (2323), in the same manner as in the bobbin (2210).

Meanwhile, the housing (2320) may further include a first lateral wall portion (2324), an outer lateral surface (2325), an inclined surface (2326), a catching sill (2328) and a first air gap (2329). They will be described in detail, with reference to FIGS. 11 to 15 hereinafter.

The stator (2400) may be disposed at a lower side of the second operator (2300) to face a lower side of the second operator (2300), in order to move the second operator (2300). In addition, penetration holes (2411, 2421) corresponding to the lens unit may be formed at a center of the stator (2400).

In particular, the stator (2400) may include a second coil portion (2410) disposed facing a lower side of the magnet (2310), and a substrate arranging the second coil portion (2410) at an upper side thereof to apply electric power. The substrate may include an FPCB (Flexible Printed Circuit Board, 2420).

The second coil portion (2410) may be mounted or formed at the FPCB (2420) provided at an upper side of the base (2500) (to be described hereinafter). A penetration hole (2411) for bypassing a light signal of the lens unit may be formed at a center of the second coil portion (2410). Meanwhile, in consideration of miniaturization of the camera module (lowering height of z-axis direction that is an optical axis direction), the second coil portion (2410) may be formed an FP (Fine Pattern) coil to be arranged on the FPCB.

The FPCB (2420) may be provided at an upper lateral surface of the base (2500), in order to apply electric power to the second coil portion (2410). A penetration hole (2421) corresponding to the penetration hole (2411) of the second coil portion (2410) may be formed at the FPCB (2420). In addition, the FPCB (2420) may include a terminal portion (2422) of which one end or both opposite ends facing each other is bent to be protruded toward a lower side of the base (2500). The FPCB (25420) may be supplied with external electric power through such terminal portion (2422).

In addition, according to an exemplary embodiment of the present disclosure, a Hall sensor portion (not illustrated) may be mounted at an upper or a lower lateral surface of the FPCB (2420), at a position corresponding to that of the magnet (2310).

The Hall sensor portion may be provided in order to sense a motion of the magnet (2310), and to precisely control the actuator by interacting with the FPCB (2420).

The Hall sensor portion may be provided on a straight line parallel to the magnet (2310) and the optical axis. In addition, the Hall sensor portion may two Hall sensors provided at each of two edges among the edges of the FPCB (2420), in order to sense displacement along x-axis and y-axis. Meanwhile, at least one of the Hall sensor may be provided. In addition, a Hall sensor accommodating groove (2540) for accommodating the Hall sensor may be formed at the base (2500).

Such Hall sensor portion may be arranged to be adjacent to the second coil portion (2410), rather than adjacent to the magnet (2310). However, the effect of the second coil portion (2410) is inconsiderable with regard to sensing the motion of the magnet (2310), in view of the fact that the intensity of electromagnetic field generated from the magnet (2310) is hundreds of times larger than that of the electromagnetic field generated from the coil.

Independent or systematic interaction between the first operator (2200), the second operator (2300) and the stator (2400) may allow the lens unit to move in all directions, to focus an image of a subject by interaction between the first operator (2200) and/or the second operator (2300), as well as to compensation trembling such as handshaking by interaction between the first operator (2200) and/or the second operator (2300).

Meanwhile, the base (2500) may support the stator (2400) and the second operator (2300), and may include, in the center thereof, a center hole (2510) corresponding to the penetration holes (2411, 2412).

The base (2500) may function as a sensor holder to protect the image sensor (not illustrated). The base (2500) may be provided in order to position an IR (infrared) filter (not illustrated).

In such case, the IR filter may be installed at the center hole (2510) formed in the center of the base (2500), and provided with an infrared ray filter. In addition, the IR filter may be formed of, for example, a film material or a glass material. Also, the IR filter may be formed by which a kind of infrared cut-off coating material is arranged on a flat optical filter such as a cover glass for image plane protection. In addition, a separate sensor holder (not illustrated) may be disposed at a lower portion of the base (2500).

In addition, the base (2500) may include at least two second lateral wall portions (2530) protruded at an upper edge of the base to contact or be coupled to an inner lateral surface of the cover can (2100). The second lateral wall portion (2530) may guide the cover can (2100) to be readily coupled as well as may facilitate concrete fixation after the coupling.

In addition, the base (2500) may include a coupling groove (2520) to which a coupling piece (2120) of the cover can (2100) is to be inserted. The coupling groove (2520) may formed in shape corresponding to a length of the coupling piece (2120) at a part of an outer lateral surface of the base (2500). Alternatively, the coupling groove (2520) may be formed at a whole outer lateral surface of the base (2500), such that a predetermined portion of a lower end of the cover can (2100) including the coupling piece (2120) can be inserted in the coupling groove (2520).

Here, foreign substance may be introduced through the penetration holes (2411, 2421) of the stator (2400) and base (2500) and the center hole (2510). Such foreign substance may pollute various elements and image sensor mounted on the printed circuit board provided at a lower part to deteriorate performance of the camera module. In particular, when the OIS (Optical Image Stabilization) function is provided, an FP coil and/or an FPCB (2420) is used. Here, penetration holes (2411, 2412) are formed in the center portion, and the shape according to the camera module is manufactured. Such manufacture generates a lot of foreign substance, and such foreign substance may remain even after the post-manufacture cleaning to cause a problem in the camera module.

Therefore, according to an exemplary embodiment of the present disclosure, an accommodating protruding portion (2550) may be protruded at an upper surface of the base (2500) formed with the center hole (2510).

In particular, the accommodating protruding portion (2550) may be formed to cover an inner circumferential surface of the penetration hole (2411, 2412) of the stator (2400), by being inserted in the penetration hole (2411, 2412). The accommodating protruding portion (2550) may be formed in a diameter same as or smaller than that of the penetration hole (2411, 2412) of the stator (2400).

In addition, the accommodating protruding portion (2550) may be integrally formed with the base (2500). As illustrated in FIG. 10, the accommodating protruding portion (2550) may be formed by being protruded in shape of a circular rim. Alternatively, at least two protrusions may be protruded at a same interval or at a predetermined interval to form the accommodating protruding portion (2550).

In addition, in order to prevent foreign substance generation from the stator (2400) and for concrete fixation of the stator (2400), an exemplary embodiment of the present disclosure may include features as in the following.

At least two adhesive groove (2560) may be formed in an outer direction of the accommodating protruding portion (2550) on an upper surface of the base (2500). The stator (2400) may include introduction grooves (2413, 2423) formed at a position corresponding to that of the adhesive groove (2560).

That is, the introduction grooves (2413, 2423) may be formed corresponding to the second coil portion (2410) and the FPCB (2420). The introduction grooves (2413, 2423) may be formed in shape of a small circular hole arranged at an outside of the respective penetration holes (2411, 2421).

When an adhesive is injected in the introduction grooves (2413, 2423) after the stator (2400) is installed at the base (2500), the adhesive injected in the introduction grooves (2413, 2423) may be introduced between an outer circumferential surface of the accommodating protruding portion (2550) and an inner circumferential surface of the penetration holes (2411, 2421) of the stator (2400), to suppress further generation of foreign substances and to secure installation of the stator (2400). In addition, the adhesive may be introduced downward to the adhesive groove (2560) formed at the base (2500) to secure more concrete coupling.

In addition, a dust trap may be formed around the center hole (2510) at an upper surface of the base (2500). Such dust trap may be formed of a material such as epoxy. The dust trap may be formed as a circle circumference having a diameter larger than that of the center hole (2510), or may be formed in various shapes such as a rectangular shape. Both of the accommodating protruding portion (2550) and the dust trap may be formed altogether. Alternatively, either one of the accommodating protruding portion (2550) or the dust trap may be formed.

According to an exemplary embodiment of the present disclosure, the camera module may further include a first operator (2200) and an elastic unit (2600) for providing a returning force to the second operator (2300). Such elastic unit (2600) may be implemented as a leaf spring in a shape where a single board material is bent and cut in consideration of production efficiency and miniaturization of the camera module.

The elastic unit (2600) may include a lower spring (2620) to be coupled to a lower surface of the bobbin (2210) and housing (2232), an upper spring (2610) to be coupled to an upper surface of the bobbin (2210) and housing (2232), and a lateral spring (2630) to be coupled to elastically support the housing (2320) with respect to the base (2500).

Two among the lateral springs (2630) may receive electric power from the printed circuit board (not illustrated) and deliver the electric power to the upper spring (2610), and the upper spring (2610) may deliver the delivered electric power again to the first coil portion (2220). In order to perform such process, the two lateral springs (2630), upper spring (2610) and first coil portion (2220) may be electrically connected to one another. Here, the upper spring (2610) may also be composed in two pieces, each of which can function as a terminal.

To sum up, the upper, lower and lateral springs (2610, 2620, 2630) may be formed as first coupling portion, second coupling portion and connecting portion to connect the first and second coupling portions. The connecting portion may be formed as at least two bending portions. Here, the first coupling portion of the upper spring (2610) and the lower spring (2620) may be a portion to be coupled to the housing, and the second coupling portion may be a portion to be connected to the bobbin, or vice versa. Meanwhile, the lateral spring (2630) is a member to elastically support the housing (2320) with respect to the base (2500). Therefore, the first and second coupling portions may be respectively coupled to the housing (2320) and the base (2500). Alternatively, the first and second coupling portions may be coupled to the upper spring (2610) coupled to the housing (2320) and the base (2500), respectively.

Meanwhile, the lens actuator according to sixth and seventh exemplary embodiments of the present disclosure may further include a magnet removal prevention portion configured to prevent a phenomenon where the magnet (2310) is removed from the magnet accommodating portion (2321) due to external force delivered from the base (2500) to the housing (2320). Hereinafter, the structure of the magnet removal prevention portion will be described in detail according to each exemplary embodiment.

Hereinafter, a structure of a lens actuator according to a sixth exemplary embodiment of the present disclosure will be described in detail, with reference to the drawings.

Figure 11:
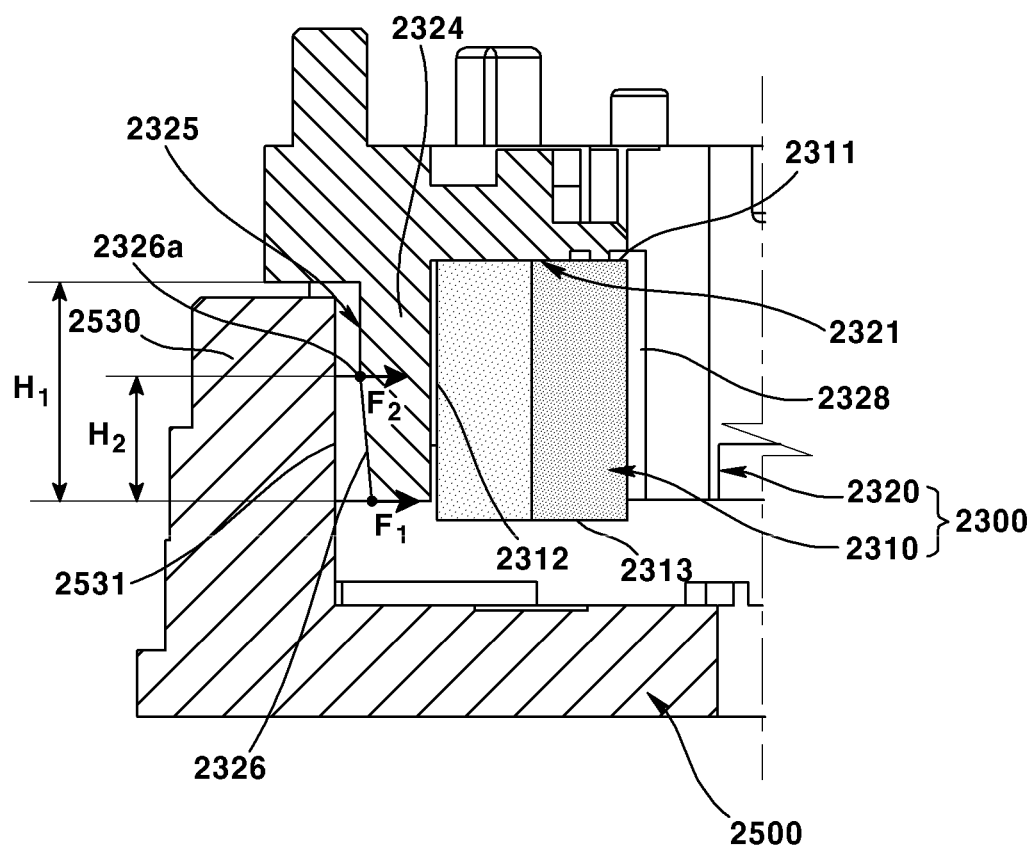
FIG. 11 is a sectional view illustrating a lens actuator according to a sixth exemplary embodiment of the present disclosure.
Figure 12:
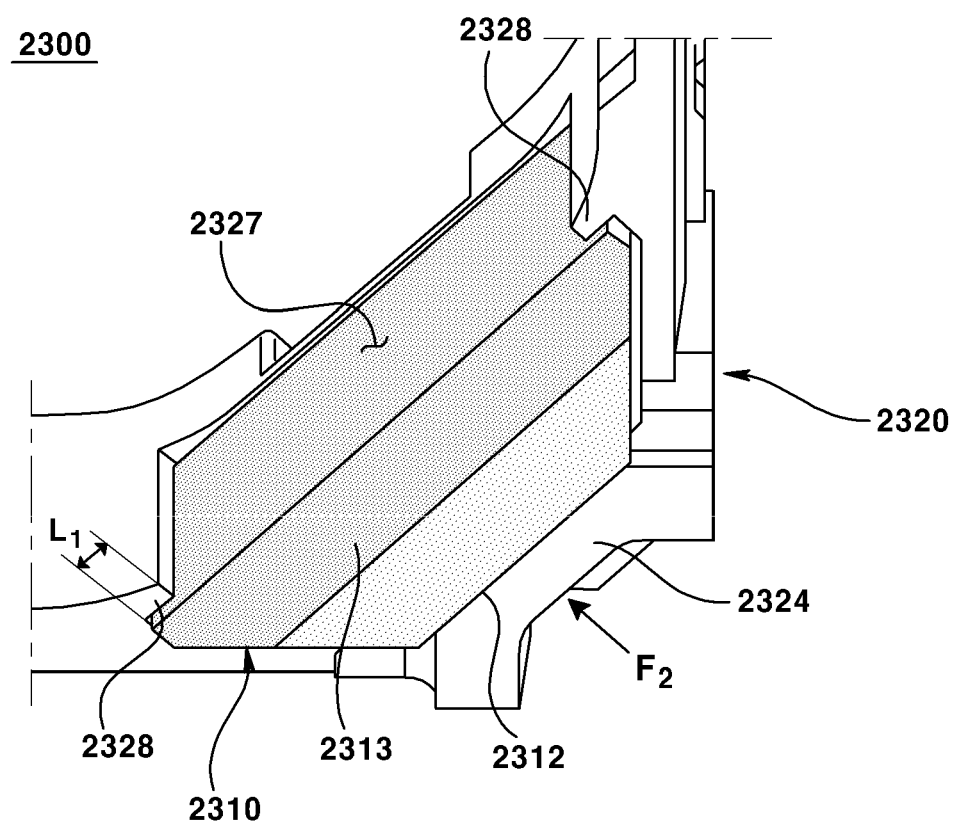
FIG. 12 is a perspective view illustrating a second operator of a lens actuator according to a sixth exemplary embodiment of the present disclosure.

FIG. 11 is a sectional view illustrating a lens actuator according to a sixth exemplary embodiment of the present disclosure; and FIG. 12 is a perspective view illustrating a second operator of a lens actuator according to a sixth exemplary embodiment of the present disclosure.

Referring to FIGS. 11 and 12, the lens actuator according to a sixth exemplary embodiment of the present disclosure may include at least one of an inclined surface (2326) and a catching sill (2328) as a magnet removal prevention portion.

The housing (2320) may include a magnet accommodating portion (2321), a first lateral wall portion (2324), an inclined surface (2326), an open surface (2327), and a catching sill (2328).

The magnet accommodating portion (2321) may include inside thereof a magnet (2310). The magnet accommodating portion (2321) may be formed in a shape corresponding to that of the magnet (2310), in order to accommodate the magnet (2310). Meanwhile, the magnet (2310) and the magnet accommodating portion (2321) may be adhered by an adhesive to be fixed. Here, the magnet (2310) may be adhered to the magnet accommodating portion (2321), where upper surface (2311) and contacting lateral surface (2312) of the magnet (2310) are adhered to the magnet accommodating portion (2321). In addition, a lower surface (2313) of the magnet (2310) may be opened without being restricted. Through such structure, the user can readily couple the magnet (2310) to the magnet accommodating portion (2321) by a process to insert the magnet (2310) from a lower portion of the magnet accommodating portion (2321). In addition, the magnetic force of the magnet (2310) may affect the second coil portion (2410) disposed at a lower portion of the magnet (2310).

Meanwhile, the structure of the housing (2320) contacting the contacting lateral surface (2312) of the magnet (2310) is referred to as a first lateral wall portion (2324). That is, the first lateral wall portion (2324) may be disposed between the magnet (2310) and the second lateral wall portion (2530) of the base (2500). Therefore, an outer lateral surface (2325) of the first lateral wall portion (2324) may be, in other words, referred to as an outer lateral surface (2325) of the housing (2320) facing an inner lateral surface (2531) of the base (2500).

Meanwhile, at least a part of the outer lateral surface (2325) of the housing (2320) facing an inner lateral surface (2531) of the base (2500) may be formed as an inclined surface (2326). In addition, as illustrated in FIG. 11, the in the inclined surface (2326) may be formed to recede farther from the inner lateral surface (2531) of the base (2500) as the inclined surface (2326) extends downward. That is, the inclined surface (2326) may function to move an impact point of external force applied to the housing (2320) toward an upper portion. As an example, the outer lateral surface (2325) of the housing (2320) may be provided as a first height (H1), and a height of the inclined surface (2326) may be a second height (H2) higher than or equal to a half of the first height (H1).

In addition, at least one surface of the magnet accommodating portion (2321) may be provided as an open surface (2327), such that magnetic force of the magnet (2310) can be applicable to the coil portions (2220, 2410) disposed inside or at a lower portion. Meanwhile, a catching sill (2328) protruded in a center direction of the open surface (2327) may be provided at both opposite lateral ends of the open surface (2327). Here, a length (L1) of the catching sill (2328) in a center direction may be formed within a predetermined length, so as not to affect the magnetic force applied to the coil portions (2220, 2410) of the magnet (2310). That is, the length (L1) of the catching sill (2328) may be extended to the longest as far as the magnetic force applied to the coil portions (2220, 2410) is not affected. The catching sill (2328) may maintain the magnet (2310) unremoved from the housing (2320) even when an external force (illustrated as 'F2' in FIG. 11) is applied.

Hereinafter, operation of the lens actuator according to a sixth exemplary embodiment of the present disclosure will be described, with reference to the drawings.

For the convenience of description, a case where the inclined surface (2326) is not provided at the first lateral wall portion (2324) of the housing (2320) will be described at first. When an external force is applied to the cover can (2100) of the camera module, the impact (external force) is delivered to the base (2500) contacting the cover can (2100). The external force delivered to the base (2500) is delivered to the housing (2320), and to the magnet (2310) accommodated in the housing (2320). Here, the outer lateral surface (2325) of the first lateral wall portion (2324) is disposed parallel to the outer lateral surface (2325) of the second lateral wall portion (2530). Therefore, the external force delivered to the base (2500) is delivered to the first lateral wall portion (2324) of the housing (2320). Meanwhile, the magnet (2310) is accommodated in the magnet accommodating portion (2321), where the upper surface (2311) and contacting lateral surface (2312) of the magnet (2310) are adhered to the magnet accommodating portion (2321). In a case where the magnet (2310) is fixed in such structure, the magnet (2310) is irresistibly forced to be removed by the external force generated from the 'F1' position as a center.

However, the camera module according to a sixth exemplary embodiment of the present disclosure may include an inclined surface (2326) at the first lateral wall portion (2324) of the housing (2320). In such case, when the external force is applied to the cover can (2100) of the camera module, the external force is delivered to the base (2500) contacting the cover can (2100) in the same manner as described in the previous case. However, the path where the external force delivered to the base (2500) is delivered to the housing (2320) is different in the present exemplary embodiment. In particular, the external force delivered to the base (2500) is delivered by contact, and therefore, the external force cannot be delivered through the 'F1' position where is spaced apart from the base (2500). Eventually, the external force delivered to the base (2500) is delivered through the 'F2' position (corresponding to a starting portion of inclination (2326a) of the inclined surface (2326)) to the housing (2320). In such case, the impact point of external force delivered to the housing (2320) has been moved upward (from 'F1' to 'F2') in comparison to the previous case. Therefore, greater external force is required to remove the magnet (2310) from the magnet accommodating portion (2320). In other words, the sixth exemplary embodiment of the present disclosure has an effect to endure greater amount of external force, in comparison to the previous comparative case.

In addition, according to the sixth exemplary embodiment of the present disclosure, a catching sill (2328) protruded in a direction perpendicular to a direction of external force (F2) delivered from the base (2500) may be provided. In such case, the magnet (2310) is restricted to be prevented from being removed, even when the magnet (2310) is pressured by the external force.

That is, the catching sill (2328) may prevent the magnet (2310) from being removed in a horizontal direction (toward the open surface (2327)), and the inclined surface (2326) may complementally prevent the magnet (2310) from being removed in a downward direction.

Hereinafter, the structure of a lens actuator according to a sixth exemplary embodiment of the present disclosure will be described, with reference to the drawings.

Figure 13:
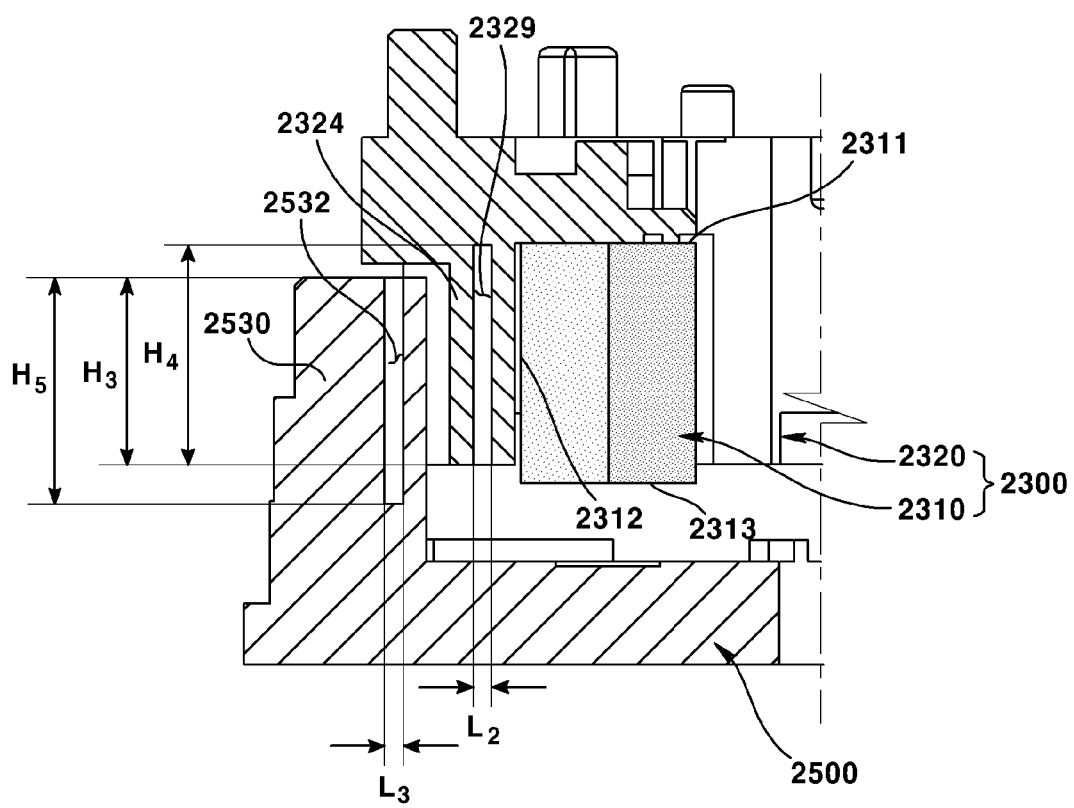
FIG. 13 is a sectional view illustrating a lens actuator according to a seventh exemplary embodiment of the present disclosure.
Figure 14:
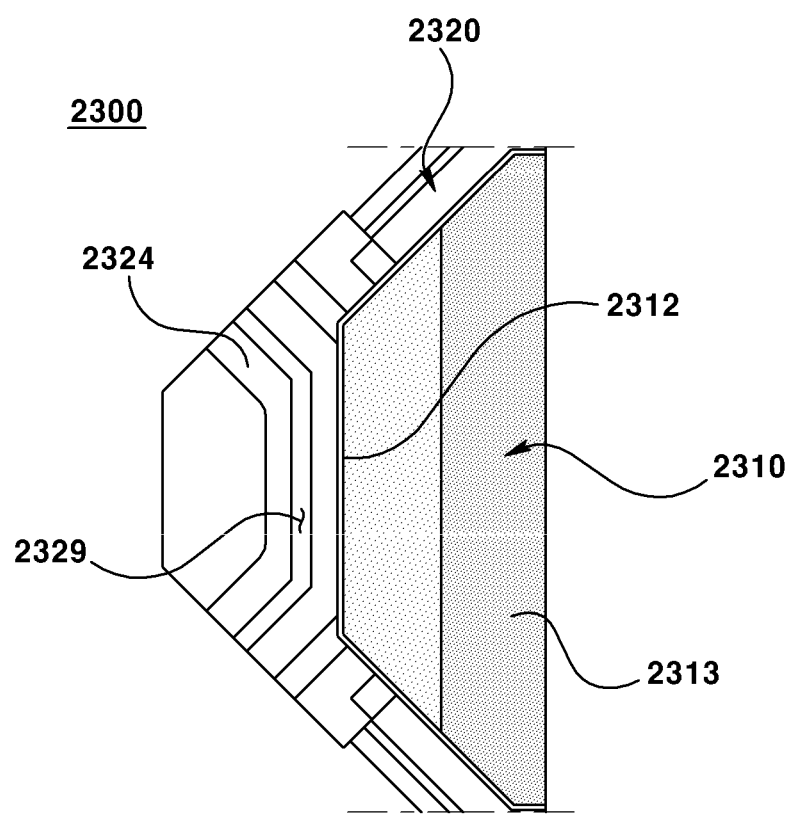
FIG. 14 is a bottom view illustrating a second operator of a lens actuator according to a seventh exemplary embodiment of the present disclosure.

FIG. 13 is a sectional view illustrating a lens actuator according to a seventh exemplary embodiment of the present disclosure; FIG. 14 is a bottom view illustrating a second operator of a lens actuator according to a seventh exemplary embodiment of the present disclosure; and FIG. 15 is a plan view illustrating a base of a lens actuator according to a seventh exemplary embodiment of the present disclosure.

Referring to FIGS. 13 through 15, the lens actuator according to a seventh exemplary embodiment of the present disclosure may include an air gap (2329, 2532) as a magnet removal prevention portion.

The housing (2320) may include a magnet accommodating portion (2321), a first lateral wall portion (2324), and a first air gap (2329).

The magnet accommodating portion (2321) may include inside thereof a magnet (2310). The magnet accommodating portion (2321) may be formed in a shape corresponding to that of the magnet (2310), in order to accommodate the magnet (2310). Meanwhile, the magnet (2310) and the magnet accommodating portion (2321) may be adhered by an adhesive to be fixed. Here, the magnet (2310) may be adhered to the magnet accommodating portion (2321), where upper surface (2311) and contacting lateral surface (2312) of the magnet (2310) are adhered to the magnet accommodating portion (2321).

Meanwhile, a surface of the magnet accommodating portion (2321) contacting the contacting lateral surface (2312) may be referred to as an adhesive surface. In addition, a lower surface (2313) of the magnet (2310) may be opened without being restricted. Through such structure, the user can readily couple the magnet (2310) to the magnet accommodating portion (2321) by a process to insert the magnet (2310) from a lower portion of the magnet accommodating portion (2321). In addition, the magnetic force of the magnet (2310) may affect the second coil portion (2410) disposed at a lower portion of the magnet (2310).

Meanwhile, the structure of the housing (2320) contacting the contacting lateral surface (2312) of the magnet (2310) is referred to as a first lateral wall portion (2324). That is, the first lateral wall portion (2324) may be disposed between the magnet (2310) and the second lateral wall portion (2530) of the base (2500). Therefore, an outer lateral surface (2325) of the first lateral wall portion (2324) may be, in other words, referred to as an outer lateral surface (2325) of the housing (2320) facing an inner lateral surface (2531) of the base (2500). The detailed description for the magnet accommodating portion (2321) is the same as that according to the sixth exemplary embodiment of the present disclosure.

Meanwhile, the first lateral wall portion (2324) of the housing (2320) may include a first air gap (2329), of which detailed description will be provided hereinafter.

The base (2500) may include a second lateral wall portion (2530) and a second air gap (2532). The second lateral wall portion (2530) may internally include the first lateral wall portion (2324). That is, the base (2500) may accommodate the housing (2320) by a method where the first lateral wall portion (2324) is inserted in the second lateral wall portion (2530).

Meanwhile, the second lateral wall portion (2530) of the base (2500) may include a second air gap (2532), of which detailed description will be provided hereinafter.

At least one of the first air gap (2329) and the second air gap (2532) may be provided. At least a part of the first air gap (2329) and/or the second air gap (2532) may be disposed on a straight line with the magnet (2310), the first lateral wall portion (2324), and the second lateral wall portion (2530). Through such structure, the first air gap (2329) and/or the second air gap (2532) may absorb external force delivered from the base (2500) to the housing (2320).

Meanwhile, the air gap (2329, 2532) may be formed by an air gap formation portion. Here, the air gap formation portion may be deformed to narrow a width of the air gap (2329, 2532) when external force is generated from the base to the housing, and may be restored to the original shape when the external force is removed.

In addition, length (H4) of the first air gap (2329) and length (H5) of the second air gap (2532) may correspond to a length (H3) where the first lateral wall portion (2324) is accommodated in the second lateral wall portion (2530). In addition, the length (H4) of the first air gap (2329) and length (H5) of the second air gap (2532) may be formed longer than the length (H3) where the first lateral wall portion (2324) is accommodated in the second lateral wall portion (2530). The area where the first air gap (2329) and the second air gap (2532) are formed may be overlapped with the contacting area of the first lateral wall portion (2324) and the second lateral wall portion (2530).

In addition, at least one side of the air gap (2329, 2523) may be opened. Through such structure, the air gap (2329, 2523) may absorb greater external force.

Hereinafter, operation of the lens actuator according to the seventh exemplary embodiment of the present disclosure will be described, with reference to the drawings.

The lens actuator according to the seventh exemplary embodiment of the present disclosure may include a first air gap (2329) formed at the first lateral wall portion (2324) of the housing (2320) and/or a second air gap (2532) formed at the second lateral wall portion (2530). In such case, the first air gap (2329) and the second air gap (2532) may function to prevent the magnet (2310) from being removed from the magnet accommodating portion (2320) due to external force delivered from the base (2500) to the housing (2320).

In particular, when the external force is applied to the cover can (2100), the impact (external force) is delivered to the base (2500) contacting the cover can (2100). The external force delivered to the base (2500) is delivered to the housing (2320), and to the magnet (2310) accommodated in the housing (2320). That is, the path of external force delivered is in the order of the cover can (2100), the base (2500), the housing (2320), and the magnet (2310). More particularly, the external force is delivered in the order of the cover can (2100), the second lateral wall portion (2530) of the base (2500), the first lateral wall portion (2324) of the housing (2320), and the magnet (2310). Meanwhile, the second air gap (2532), disposed on the external force delivering path of the second lateral wall portion (2530), and the first air gap (2329), disposed on the external force delivering path of the first lateral wall portion (2324), may absorb the external force. Once the external force is delivered to the second air gap (2532) or the first air gap (2329), the air gap formation portion forming the air gap (2329, 2532) may be deformed to narrow a width (L2, L3) of the air gap (2329, 2532). Most external force to be delivered to the magnet (2310) may be offset during such process. Afterwards, when the external force is removed, the air gap formation portion may be restored to the original shape by elastic force.

Therefore, the camera module according to the seventh exemplary embodiment of the present disclosure also has an advantageous effect, like the camera module according to the sixth exemplary embodiment of the present disclosure, in that the magnet may be prevented from being removed from the magnet accommodating portion of the housing, even when external force is applied to the camera module.

Although each of the sixth and seventh exemplary embodiments has been independently described herein for convenience of description, the sixth and seventh exemplary embodiments may be implemented together in a single embodiment. Alternatively, partial structures of the exemplary embodiments may be implemented in combination.

In the above, all elements composing an exemplary embodiment of the present disclosure have been described as being integrally combined or operating in combination, however, the present disclosure is not limited hereto, That is, within the scope of purpose of the present disclosure, at least one of all such elements may be selectively combined to operate. In addition, the terms such as "include", "comprise" or "have" are state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

What is claimed is:
1. A lens driving device, comprising:
   a housing comprising a hole;
   a bobbin disposed inside the housing;
   a first coil disposed on the bobbin;
   a magnet disposed on the housing and facing the first coil;
   a base disposed below the housing;
   a board comprising a second coil disposed on the base and facing the magnet; and
   an adhesive fixing the magnet to the housing;
   wherein the housing comprises a first lateral wall, a second lateral wall, and a rib disposed between the first lateral wall and the second lateral wall;
   wherein the magnet comprises an inner surface facing with the first coil, a lower surface facing with the second coil, an upper surface facing with a lower surface of the rib, a first lateral surface facing the first lateral wall, and a second lateral surface facing the second lateral wall;
   wherein the rib comprises a first groove disposed on the lower surface of the rib and accommodating at least a portion of the adhesive, and
   wherein the first groove of the rib is opened toward the hole of the housing.

2. The lens driving device of claim 1, wherein the first groove of the rib comprises a plurality of groove parts spaced apart from each other.

3. The lens driving device of claim 2, wherein the plurality of groove parts comprise a first groove part and a second groove part, and
   wherein the rib further comprises a third groove part connecting the first groove part and the second groove part.

4. The lens driving device of claim 3, wherein the plurality of groove parts further comprise a fourth groove part disposed between the first groove part and the second groove part, and
   wherein a distance between the first groove part and the fourth groove part is equal to a distance between the second groove part and the fourth groove part.

5. The lens driving device of claim 4, wherein a length from an inner end of the fourth groove part to an outer end of the fourth groove part is longer than a length from an inner end of the first groove part to an outer end of the first groove part.

6. The lens driving device of claim 4, wherein a length from an inner end of the first groove part to an outer end of the first groove part is equal to a length from an inner end of the second groove part to an outer end of the second groove part.

7. The lens driving device of claim 6, wherein the length from an inner end of the first groove part to an outer end of the first groove part is equal to a distance from the third groove part and an inner lateral surface of the rib.

8. The lens driving device of claim 2, wherein the plurality of groove parts comprise first to fourth groove parts,
   wherein the rib further comprises a fifth groove part connecting the first groove part and the second groove part, and a sixth groove part connecting the third groove part and the fourth groove part; and
   wherein the fifth groove part is spaced apart from the sixth groove part.

9. The lens driving device of claim 1, wherein the rib further comprises a second groove disposed on the lower surface of the rib and comprising a shape different from that of the first groove.

10. The lens driving device of claim 9, wherein the second groove comprises two circular groove parts and a linear groove part connecting the two circular groove parts.

11. The lens driving device of claim 9, wherein a depth of the first groove from the lower surface of the rib is deeper than or equal to a depth of the second groove from the lower surface of the rib.

12. The lens driving device of claim 9, wherein the first groove is disposed on the second groove.

13. The lens driving device of claim 3, wherein the third groove part extends from the first lateral wall of the housing toward the second lateral wall of the housing.

14. The lens driving device of claim 9, wherein the first groove is spaced apart from the second groove.

15. The lens driving device of claim 9, wherein a portion of the first groove is connected with a portion of the second groove.

16. The lens driving device of claim 1, wherein the magnet further comprises an outer surface disposed opposite the inner surface of the magnet, and wherein the upper surface of the magnet, the first lateral surface of the magnet, the second lateral surface of the magnet, and the outer surface of the magnet are fixed to the housing.

17. A camera module, comprising:
a printed circuit board;
an image sensor disposed on the printed circuit board; and
the lens driving device of claim 1 disposed on the printed circuit board.

18. An optical apparatus, comprising:
a main body;
the camera module of claim 17 disposed on the main body; and
a display unit disposed on the main body and displaying a picture photographed by the camera module.

19. A lens driving device, comprising:
a housing;
a bobbin disposed inside the housing;
a first coil disposed on the bobbin;
a magnet disposed on the housing and facing the first coil;
a base disposed below the housing;
a board comprising a second coil disposed on the base and facing the magnet; and
an adhesive fixing the magnet to the housing,
wherein the housing comprises a first lateral wall, a second lateral wall, and a rib disposed between the first lateral wall and the second lateral wall;
wherein the magnet is fixed to the first lateral wall of the housing, the second lateral wall of the housing, and the rib of the housing;
wherein the rib comprises a groove disposed on a lower surface thereof and accommodating at least a portion of the adhesive; and
wherein the groove is opened toward the bobbin.

20. A lens driving device, comprising:
a housing;
a bobbin disposed inside the housing;
a first coil disposed on the bobbin;
a magnet disposed on the housing and facing the first coil;
a base disposed below the housing; and
a board comprising a second coil disposed on the base and facing the magnet;
wherein the housing comprises a first lateral wall, a second lateral wall, and a rib disposed between the first lateral wall and the second lateral wall;
wherein an adhesive is disposed between a first surface of the magnet and a lower surface of the rib,
wherein the rib comprises a groove disposed on the lower surface of the rib and opened toward an inner lateral surface of the rib, and
wherein the adhesive is disposed on the groove so that the adhesive couples the first surface of the magnet and the lower surface of the rib.

* * * * *